United States Patent [19]
Mendel

[11] Patent Number: 5,732,206
[45] Date of Patent: Mar. 24, 1998

[54] METHOD, APPARATUS AND PROGRAM PRODUCT FOR DISRUPTIVE RECOVERY IN A DATA PROCESSING SYSTEM

[75] Inventor: Gili Mendel, Port Ewen, N.Y.

[73] Assignee: International Business Machines Corporation, Armonk, N.Y.

[21] Appl. No.: 685,295

[22] Filed: Jul. 23, 1996

[51] Int. Cl.⁶ ...................................................... G06F 11/20
[52] U.S. Cl. .................. 395/182.02; 395/182.13; 395/182.08; 370/221
[58] Field of Search ............... 395/182.02, 182.13, 395/182.14, 182.08, 682, 670, 200.1; 370/221

[56] References Cited

U.S. PATENT DOCUMENTS

| | | | |
|---|---|---|---|
| 5,023,873 | 6/1991 | Stevenson et al. | 395/182.02 |
| 5,065,399 | 11/1991 | Hasegawa | 395/182.02 |
| 5,159,597 | 10/1992 | Monahan et al. | 395/181 |
| 5,379,278 | 1/1995 | Safadi | 370/221 |
| 5,386,544 | 1/1995 | Nakamura | 395/182.13 |
| 5,426,774 | 6/1995 | Banerjee et al. | 395/182.14 |
| 5,444,693 | 8/1995 | Arslan et al. | 370/221 |
| 5,463,733 | 10/1995 | Forman et al. | 395/182.08 |
| 5,528,750 | 6/1996 | Lubart et al. | 395/182.13 |
| 5,550,973 | 8/1996 | Forman et al. | 395/182.08 |

*Primary Examiner*—Ly Hua
*Attorney, Agent, or Firm*—Floyd A. Gonzalez

[57] ABSTRACT

A method, apparatus and program product for performing a disruptive recovery in a data processing system including establishing an upper limit of delay that may be taken before starting a recovery process and establishing a set time for stalling. A first event for which a recovery process is normally started is then received and the start of the recovery process is stalled for the set time for stalling after receipt of the first event. Events subsequent to the first event are received until either the time between the receipt of successive events exceeds the set time for stalling, or until the upper limit of delay between the receipt of the first event and the receipt of the last received event is exceeded. After the time limit is exceeded, the recovery process is performed and the operation is started over with the receipt of a new first event.

12 Claims, 2 Drawing Sheets

METHOD, APPARATUS AND PROGRAM PRODUCT FOR DISRUPTIVE RECOVERY IN A DATA PROCESSING SYSTEM

The present invention is related to performing disruptive recoveries in a data processing system, and is more particularly related to delaying the start of recoveries in a data processing system to provide for more efficient recoveries.

BACKGROUND OF THE INVENTION

In some data processing systems, clustered nodes communicate with each other through a switch, and may be jointly assigned to a single resource such that if the node primarily responsible for the resource fails, another one of the nodes may be used as a backup. However, when the primary node is again available, a recovery, such as reconnecting the recovered node to the switch, must be performed which, because of the time the recovery takes, is disruptive of the operation of the data processing system.

U.S. Pat. No. 5,023,873 issued Jun. 11, 1991 to Stevenson et al. for METHOD AND APPARATUS FOR COMMUNICATION LINK MANAGEMENT and discloses a communication link manager for problem determination and recovery of a failing resource on a communication link segment.

U.S. Pat. No. 5,065,399 issued Nov. 12, 1991 to Hasegawa et al. for TELECOMMUNICATION NETWORK TROUBLE RECOVERY SYSTEM and discloses an apparatus for rapid restoration of a telecommunication path between network nodes after an interrupting network link failure.

U.S. Pat. No. 5,379,278 issued Jan. 3, 1995 to Safadi for METHOD OF AUTOMATIC COMMUNICATIONS RECOVERY and discloses an apparatus wherein a node attempts to reconnected itself to a local area network system having redundant communications media.

U.S. Pat. No. 5,444,693 issued Aug. 22, 1995 to Arslan et al. for SYSTEM FOR RESTORATION OF COMMUNICATIONS NETWORKS and discloses a restoration processor for each node of a communications network in which predetermined functions of the restoration process are managed by respective ones of a plurality of manager modules. Among the enhancements to the functionality of the manager modules is the elimination of the need for time-outs during automatic restoration.

SUMMARY OF THE INVENTION

A method, apparatus and program product is disclosed for performing a disruptive recovery in a data processing system including establishing an upper limit of delay that may be taken before starting a recovery process and establishing a set time for stalling. A first event for which a recovery process is normally started is then received and the start of the recovery process is stalled for the set time for stalling after receipt of the first event. Events subsequent to the first event are received until either the time between the receipt of successive events exceeds the set time for stalling, or until the upper limit of delay between the receipt of the first event and the receipt of the last received event is exceeded. After the time limit is exceeded, the recovery process is conditionally performed, if needed, and the operation is started over with the receipt of a new first event.

It is an object of the present invention to provide for a delay having an upper limit which is chosen such that the delay is transparent to the recovery process.

It is another object of the present invention to provide for a stall time period for stalling the start of recovery which is long enough to allow transients to pass which would otherwise appear as a node failure, when the node has in fact not failed.

It is another object of the present invention for allowing for more than one event to occur as long as successful events are not more than the stall period apart, and as long as the total time period for all events is not longer than the upper time limit.

It is another object of the present invention for allowing for a plurality of disruptive recovery events to be merged into a single recovery process, wherein the merged recovery process is invisible because of the upper time limit chosen.

It is another object of the present invention to provide a diagnostic routine which determines if recovery is actually needed after at least a stall time after the arrival of an event which would otherwise be viewed as requiring the performance of a disruptive recovery.

The foregoing and other objects, features and advantages of the invention will be apparent from the following more particular description of the preferred embodiment of the invention as illustrated in the drawings.

BRIEF DISCRIPTION OF THE DRAWINGS

DESCRIPTION OF THE PREFERRED EMBODIMENT

Figure 1:
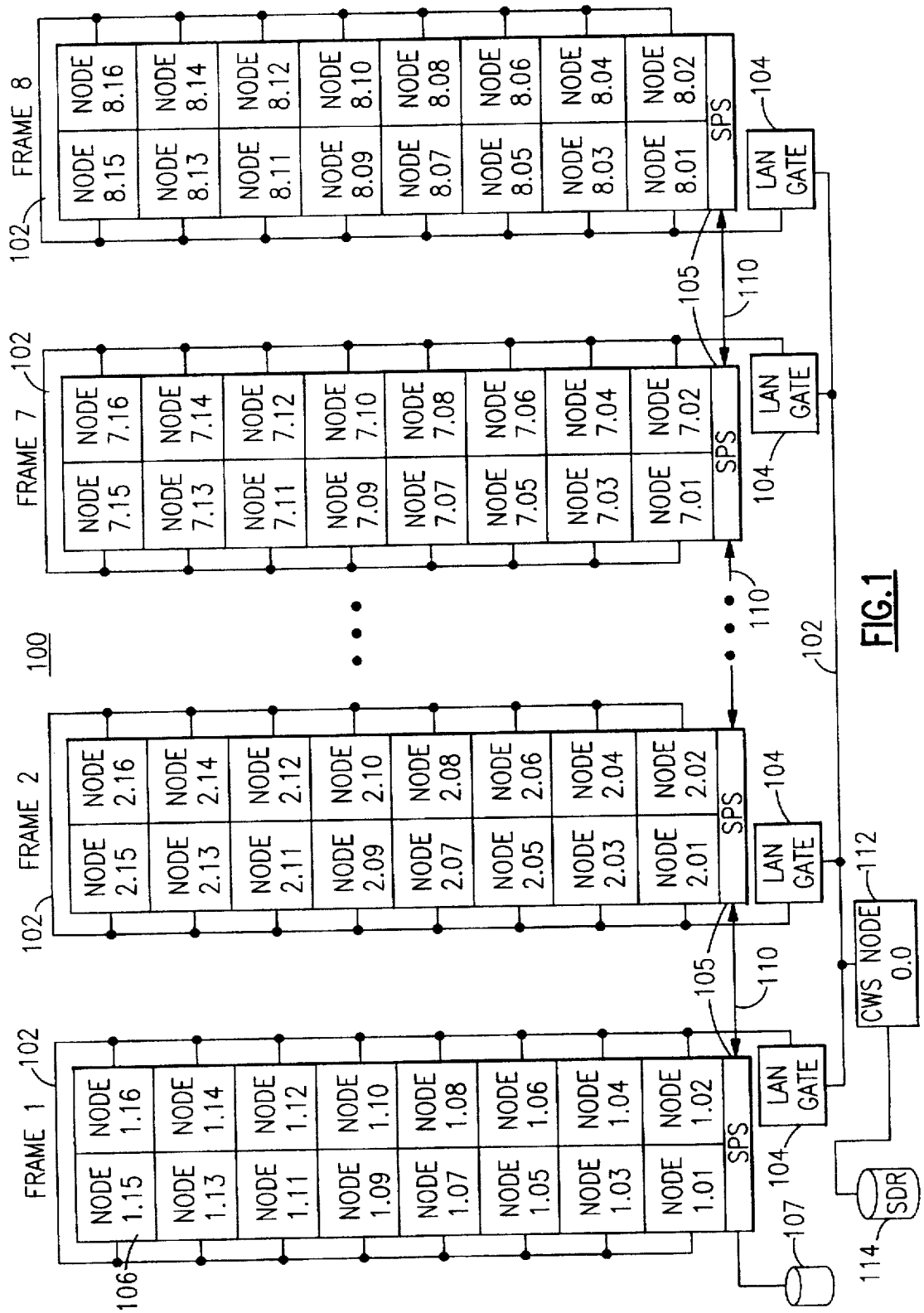
FIG. 1 is a schematic diagram of a distributed computer system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes an a frame of the SP computer 100 is included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as those nodes 106 which are powered up and available for processing data. Each node 106 also includes a DASD device 107 for storing data processed by the SP computer 100, and additionally contains local copies of the SDR file on DASD 114.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends system data and control signals to the frames of the SP computer 100 by means of the LAN 102 while messages and data may be sent between the nodes 106 by means of the high performance switches 105.

Figure 2:
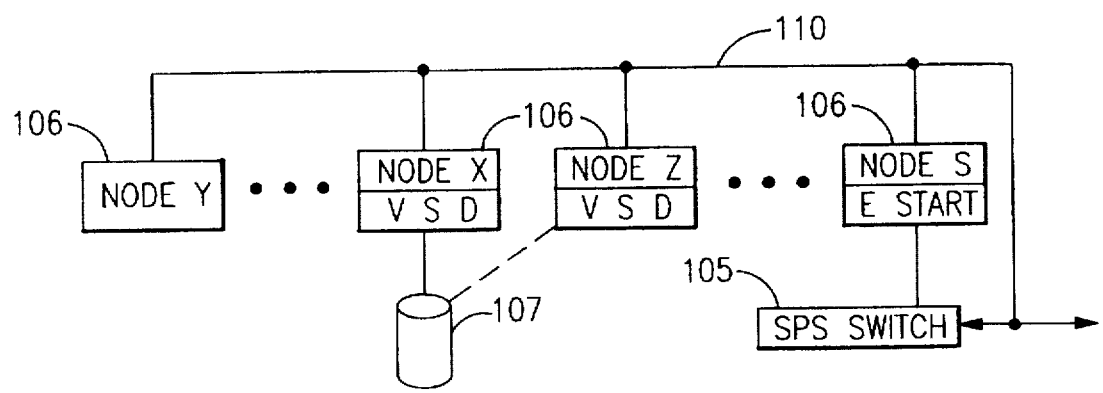
FIG. 2 is a schematic diagram of a portion of the distributed computer system of FIG. 1.

FIG. 2 is a schematic diagram of a portion of the SP computer 100 of FIG. 1. In FIG. 2, four of the nodes 106 are shown individually as node X, node Y, node Z, and node S to illustrate the use of the present invention. Node X is a primary controller for its DASD device 107. A virtual shared disc (VSD) subsystem in node X, available from IBM, is a facility for controlling the DASD device 107. A similar VSD facility in node Z provides that node Z may take over control of the DASD device 107 if node X fails, as is known.

Node S is one of the nodes 106 which has been assigned to be the controller for the SPS switch 105, in a manner known in the art. Typically, node S is the CSW 112, but it could be assigned to any of the nodes 106. All of the nodes 106 are attached to the switch 105 by means of bus 110, as previously explained.

When the primary node X, which controls the DASD device 107, fails or appears to fail, the node X is disconnected from the SPS switch 105, and control of the DASD device is switched to node Z by means of the VSD facilities. If node Y wishes to send data or receive data from DASD device 107 after the failure of node X, it may do so by sending messages to node Z, as is understood in the art. When node X comes back on line and is available for controlling the DASD device 107 control is returned by the VSD subsystem to node X. However, node X cannot be reconnected to the SPS switch 105 until node S issues the Estart command to accomplish the reconnection. Thus, after node X has come back on line and the DASD device 107 is again controlled by node X, data sent between node Y and the DASD device 107 will not be properly stored or retrieved from the DASD device 107 until the node X is reconnected to the high performance switch 105. The Estart command is fully explained in the "SP: Command and Technical Reference" available from International Business Machines Corporation under the publication number GC23-3900-01.

It will be understood that recovery of failed node X includes the Estart command which is very disruptive to the operation of the computer system 100 in that it takes a long period of time. The present invention allows for recovery to take place but provides for a stall, which stalls the disruptive recovery process for a sufficient time to insure that events, such as the failure of node X, are in fact a failures and not a transient, such as the temporary unavailability of a resource which may appear as a failure but is not.

Further, as is well understood, the Estart command may be used to connect a plurality of nodes to the SPS switch 105. Thus, if it is possible to wait until a group of nodes are ready to be connected, only one Estart command will need to be issued to connect the group of nodes to the SPS switch instead of a separate Estart command for each node to be connected.

The present invention provides for a delay having an upper limit which is chosen such that it is transparent to the VSD recovery process. The present invention also provides for a stall time period for stalling the start of recovery which is long enough to allow transients to pass which would otherwise appear as a node failure, when the node has in fact not failed.

Figure 3:
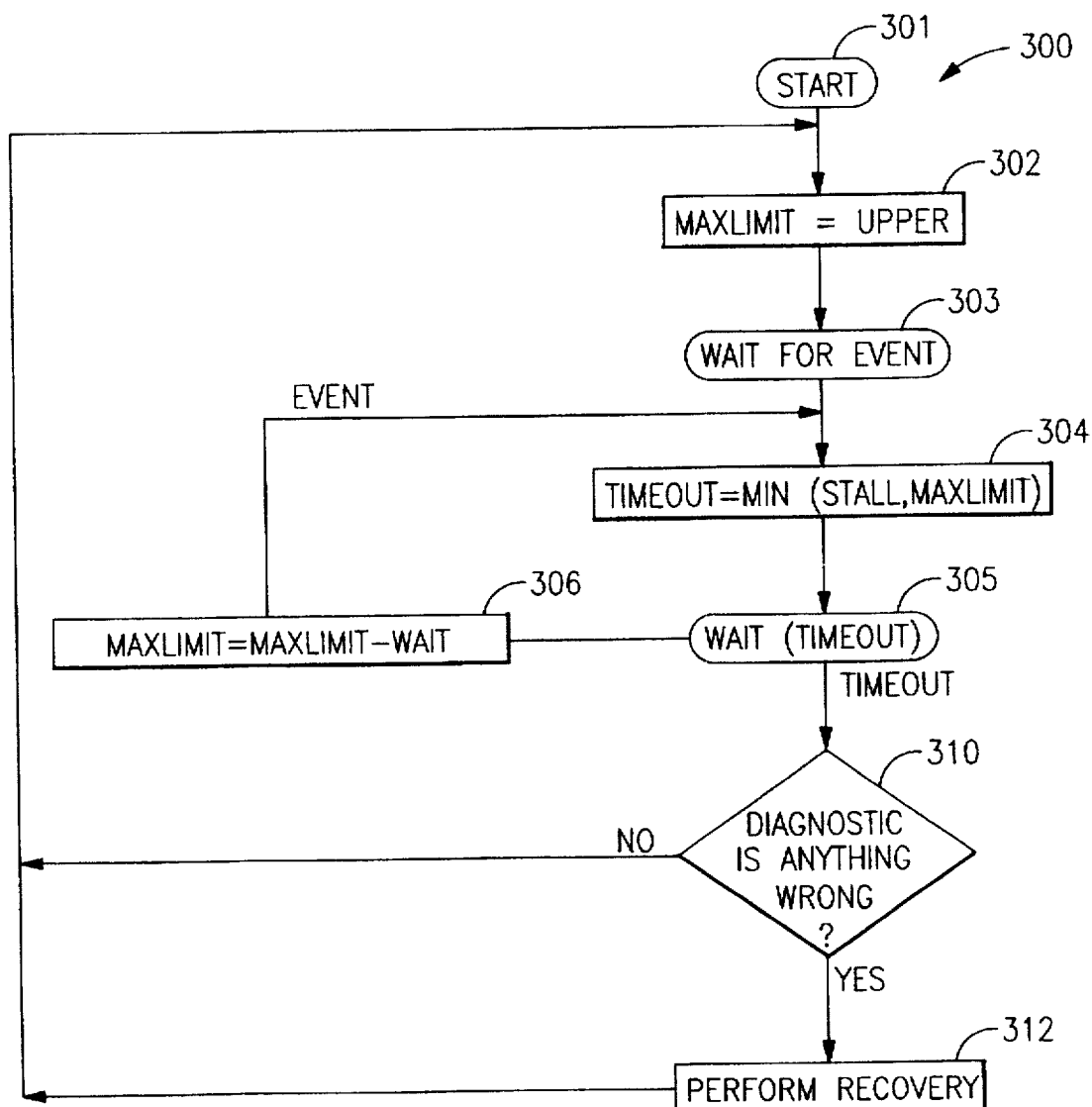
FIG. 3 is a flow chart of a computer program of one implementation of the present invention.

FIG. 3 is a flow chart 300 of one implementation of the present invention. The program of the flow chart 300 is run by the CSW 112 of the SP computer 100 of FIG. 1 to process events, such as the failure of nodes, that are reported to the CSW 112 over the LAN 102.

The program starts at 301. At 302, a parameter MAXLIMIT is set equal to the upper limit. As previously mentioned, the upper limit is chosen such that it is invisible to the recovery process, in this case the VSD subsystem recovery. In the present environment the upper limit is set for ten minutes, and the stall time is set for 60 seconds. As will be explained, the parameter MAXLIMIT may be recalculated by the program such that the upper limit is not exceeded.

At 303, the program waits for the receipt of an event which normally, without the present invention, requires the recovery process. After the receipt of a first event at 303, the program goes to 304 wherein a TIMEOUT parameter is set equal to the minimum of either the predetermined stall time or the last calculated value of the parameter MAXLIMIT. At 305, the program waits for the period indicated by the TIMEOUT parameter for a subsequent event to arrive. If a subsequent event is received by the controlled workstation 112 the program recalculates the parameter max limit by setting MAXLIMIT equal to MAXLIMIT minus the wait time that expired at 305 before the event arrived. The program then returns to 304 where a new TIMEOUT parameter is selected as either the stall time or the newly calculated max limit, whichever is smaller. The program then returns to 305 to wait for the indicated time out period for the arrival of a subsequent event. If the wait period times out, in other words an event is not received by the end of either the stall time or the maximum limit as chosen at 304, the program goes to 310 where a diagnostic is performed to determine if anything is wrong.

The diagnostic at 310 determines whether the event was only a transient which does not really require the recovery process or if in fact the event does require a recovery process. If the diagnostic at 310 does not determine that recovery is required, the program returns to 302 where the parameter MAXLIMIT is once again set equal to the upper limit value. If, the diagnostic at 310 determines that recovery is required, the program goes to 312 where recovery is in fact performed.

In the present environment, this recovery process would include the Estart command for connecting nodes to the SPS switch 105, as previously explained. After the recovery process has been completed at 312, the program returns to 302 where the MAXLIMIT parameter is again set equal to the upper time limit.

It will be understood that the stall parameter is a time period less than the upper time limit, and is sufficiently long to allow for the passing of transients. Thus, the program of the flow chart 300 allows for more than one event to occur as long as successful events are not more than the stall period apart, and as long as the total time period for all events is not longer than the upper time limit. Thus, the program of FIG. 3 allows for a plurality of disruptive recovery events to be merged into a single recovery process, wherein the merged recovery process is invisible because of the upper time limit chosen. Furthermore, the program of FIG. 3 allows for a stall time period between the arrival of events, wherein the stall time period is sufficiently long to allow for transients to occur which would otherwise appear as a failure requiring recovery. Furthermore, the program of FIG. 3 includes a diagnostic routine which determines if recovery is actually needed after the arrival of an event which would otherwise be viewed as requiring the performance of a disruptive recovery.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patent is:

1. A method for performing a disruptive recovery in a data processing system comprising the steps of:

establishing an upper limit of delay that may be taken before starting a recovery process;

establishing a set time for stalling;

waiting for the receipt of a first event for which a recovery process is normally started;

stalling the start of the recovery process for said set time for stalling after receipt of said first event;

receiving events subsequent to said first event until either the time between the receipt of successive events exceeds said set time for stalling, or until the upper limit of delay between the receipt of said first event and the receipt of the last received event is exceeded;

conditionally starting said recovery process; and after completion of said recovery process, returning to said waiting for receipt of said first event step.

2. The method of claim 1 wherein, before the starting said recovery process step, including the following steps:

determining if the recovery process is still needed; and if said recovery process is not needed, returning to said waiting for the receipt of said first event step.

3. An apparatus for performing a disruptive recovery in a data processing system comprising:

means for waiting for the receipt of a first event for which a recovery process is normally started;

means for stalling the start of the recovery process for a predetermined set time for stalling after receipt of said first event;

means for receiving events subsequent to said first event until either the time between the receipt of successive events exceeds said set time for stalling, or until the delay between the receipt of said first event and the receipt of the last received event exceeds a predetermined upper limit;

means for conditionally starting said recovery process; and means for returning to said waiting for receipt of said first event after completion of said recovery process.

4. The apparatus of claim 3 including:

means for determining if the recovery process is still needed; and if said recovery process is not needed, means for returning to said waiting for the receipt of said first event without starting the recovery process.

5. A program product recorded on a computer readable medium, the program product for performing a disruptive recovery in a data processing system, the program product comprising:

means for waiting for the receipt of a first event for which a recovery process is normally started;

means for stalling the start of the recovery process for a predetermined set time for stalling after receipt of said first event;

means for receiving events subsequent to said first event until either the time between the receipt of successive events exceeds said set time for stalling, or until the delay between the receipt of said first event and the receipt of the last received event exceeds a predetermined upper limit;

means for starting said recovery process; and means for returning to said waiting for receipt of said first event after completion of said recovery process.

6. The program product of claim 5 including:

means for determining if the recovery process is still needed; and if said recovery process is not needed, means for returning to said waiting for the receipt of said first event without starting the recovery process.

7. A method for merging disruptive recoveries in a data processing system comprising the steps of:

a) calculating a MAXLIMIT to be equal to a predetermined upper limit;

b) waiting for the receipt of a first event for which a recovery process is normally started;

c) setting a timeout period equal to the lesser of a predetermined stall time or the last calculated MAXLIMIT;

d) waiting for said timeout period;

e) if a subsequent event for which a recovery process is normally started is received before the end of the timeout period, recalculating the MAXLIMIT equal to MAXLIMIT less the waiting time; and f) returning to step c.

8. The method of claim 7 further comprising the steps of:

g) if an event for which recovery is normally started is not received before the end of the last calculated timeout period, performing a diagnosis to determine if a recovery is still needed;

h) if recovery is not needed returning to step a; and i) if step g determines that recovery is still needed, performing said recovery, and j) returning to step a, thereby merging disruptive recoveries into a single recovery process.

9. An apparatus for merging disruptive recoveries in a data processing system, said apparatus comprising:

means for calculating a MAXLIMIT to be equal to a predetermined upper limit;

receipt means for waiting for the receipt of a first event for which a recovery process is normally started;

setting means connected to said receipt means for setting a timeout period equal to the lesser of a predetermined stall time or the last calculated MAXLIMIT after receipt of an event for which recovery is normally started;

waiting means connected to said setting means for waiting for said timeout period;

first determining means connected to said waiting means for determining if a subsequent event for which a recovery process is normally started is received before the end of the timeout period;

recalculating means connected to said first determining means for recalculating the MAXLIMIT equal to MAXLIMIT less the waiting time if said first means for determining determines that a subsequent event is received before the end of the time period; and means connected to said recalculating means for returning to said receipt means to wait for another first event after said MAXLIMIT is recalculated.

10. The apparatus of claim 9 further comprising:

second determining means connected to said first determining means for performing a diagnosis to determine if a recovery is still needed if said first determining means determines that an event for which recovery is normally started was not received before the end of the last calculated timeout period;

means connected to said second determining means for returning to said setting means thereby setting said MAXLIMIT equal to said upper limit if said second determining means determines that recovery is not needed; and means connected to said second determining means for performing said recovery if said second determining means determines that recovery is still needed, thereby merging disruptive recoveries into a single recovery.

11. A program product recorded on a computer readable medium, said program product for merging disruptive recoveries in a data processing system, said program product comprising:

means for calculating a MAXLIMIT to be equal to a predetermined upper limit;

receipt means for waiting for the receipt of a first event for which a recovery process is normally started;

setting means for setting a timeout period equal to the lesser of a predetermined stall time or the last calculated MAXLIMIT after receipt of an event for which recovery is normally started;

waiting means for waiting for said timeout period;

first determining means for determining if a subsequent event for which a recovery process is normally started is received before the end of the timeout period;

recalculating means for recalculating the MAXLIMIT equal to MAXLIMIT less the waiting time if said first means for determining determines that a subsequent event is received before the end of the time period; and means for returning to said receipt means to wait for another first event after said MAXLIMIT is recalculated.

12. The program product of claim 11 further comprising:

second determining means for performing a diagnosis to determine if a recovery is still needed if said first determining means determines that an event for which recovery is normally started was not received before the end of the last calculated timeout period;

means for returning to said setting means thereby setting said MAXLIMIT equal to said upper limit if said second determining means determines that recovery is not needed; and means for performing said recovery if said second determining means determines that recovery is still needed, thereby merging disruptive recoveries into a single recovery.

* * * * *